United States Patent
Lyubomirsky et al.

(10) Patent No.: US 11,438,211 B1
(45) Date of Patent: Sep. 6, 2022

(54) ADAPTIVE DIAGNOSTICS FOR COMMUNICATION SYSTEMS

(71) Applicant: Marvell Asia Pte, Ltd., Singapore (SG)

(72) Inventors: Ilya Lyubomirsky, Pleasanton, CA (US); Jamal Riani, Fremont, CA (US)

(73) Assignee: Marvell Asia Pte Ltd., Singapore (SG)

(*) Notice: Subject to any disclaimer, the term of this patent is extended or adjusted under 35 U.S.C. 154(b) by 0 days.

(21) Appl. No.: 16/937,070

(22) Filed: Jul. 23, 2020

(51) Int. Cl.
*G06F 15/173* (2006.01)
*H04L 41/0631* (2022.01)
*H04L 41/16* (2022.01)
*H04L 43/0817* (2022.01)
*H04L 43/04* (2022.01)
*G06F 15/16* (2006.01)
*G06N 7/00* (2006.01)

(52) U.S. Cl.
CPC ........ *H04L 41/0636* (2013.01); *H04L 41/064* (2013.01); *H04L 41/0645* (2013.01); *H04L 41/16* (2013.01); *H04L 43/04* (2013.01); *H04L 43/0817* (2013.01); *G06N 7/005* (2013.01)

(58) Field of Classification Search
CPC . H04L 41/0636; H04L 41/16; H04L 43/0817; H04L 41/0645; H04L 43/04; H04L 41/064; G06N 7/005
USPC .......................................... 709/224
See application file for complete search history.

(56) References Cited

U.S. PATENT DOCUMENTS

| | | | |
|---|---|---|---|
| 9,213,947 B1 * | 12/2015 | Do ......................... | G16B 40/00 |
| 10,992,557 B1 * | 4/2021 | Matthews ............... | H04L 43/18 |
| 2019/0349263 A1 * | 11/2019 | Ghosh ..................... | H04L 41/16 |
| 2020/0175374 A1 * | 6/2020 | Hestness .............. | G06N 3/0472 |
| 2020/0334809 A1 * | 10/2020 | Vianu .................... | G06N 7/005 |
| 2020/0412586 A1 * | 12/2020 | Mcloughlin ....... | H04B 10/0731 |
| 2021/0157310 A1 * | 5/2021 | Lavid Ben Lulu ......................... G05B 23/0283 |
| 2021/0203576 A1 * | 7/2021 | Padfield .................. | H04L 41/16 |

* cited by examiner

*Primary Examiner* — Karen C Tang

(57) ABSTRACT

The present invention is directed to communication systems. According to a specific embodiment, the present invention provides a network device that collects telemetry measurements related to the quality of data communication. A machine learning algorithm generates probability determinations using the telemetry measurements and an inference model. The probability determinations are used to generate alarms signals or activate repair algorithms. There are other embodiments as well.

20 Claims, 6 Drawing Sheets

| Sample | X1 | X2 | X3 | X4 | X5 | X6 | ...... | Xm | Y=failure category |
|---|---|---|---|---|---|---|---|---|---|
| Link 1 | | | | | | | | | |
| Link 2 | | | | | | | | | |
| Link 3 | | | | | | | | | |
| ...... | | | | | | | | | |
| Link n | | | | | | | | | |

Figure 5

ADAPTIVE DIAGNOSTICS FOR COMMUNICATION SYSTEMS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to communication systems.

Over the last few decades, the use of communication networks has exploded. In the early days of the Internet, popular applications were limited to emails, bulletin board, and mostly informational and text-based web page surfing, and the amount of data transferred was relatively small. Today, the Internet and mobile applications demand a huge amount of bandwidth for transferring photo, video, music, and other multimedia files. Data centers often need to transmit and process hundreds of terabytes of data hourly. With such high demands on data storage and data transfer, existing data communication systems need to be improved to address these needs.

To keep communication systems working properly, it is important to monitor network performance and diagnose link failures. However, diagnosing link failures is often challenging and expensive, as network systems have many components and entities, and it is difficult to determine the cause of link failures. Therefore, improved systems and methods for network communication systems are desired.

BRIEF SUMMARY OF THE INVENTION

The present invention is directed to communication systems. According to a specific embodiment, the present invention provides a network device that collects telemetry measurements related to the quality of data communication. A machine learning algorithm generates probability determinations using the telemetry measurements and an inference model. The probability determinations are used to generate alarms signals or activate repair algorithms. There are other embodiments as well.

According to an embodiment, the present invention provides a network system, which includes a data communication link. The system also includes a first network device comprising a first communication interface for transmitting and receiving data over the data communication link. The system further includes a network management device. The system also includes a second network device. The second network device includes a second communication interface configured for receiving the data via the data communication link and collecting telemetry measurements. The second network device also includes an inference module configured for generating probability determinations using a machine learning algorithm and the telemetry measurements. The second network device further includes a control module configured to alert the network management device based on the probability determination.

According to another embodiment, the present invention provides a network apparatus, which includes a communication interface configured for receiving the data via a data communication link and collecting telemetry measurements. The communication interface has a DSP module for transmitting data and an ASIC module for receiving data. The apparatus also includes an inference module configured for generating probability determinations using a machine learning algorithm and the telemetry measurements. The apparatus further includes a control module configured to generate an algorithm to repair a receiving error based on the probability determinations.

According to yet another embodiment, the present invention provides a method for performing network diagnostics. The method includes initializing a machine learning module. The method also includes collecting a first set of telemetry measurements at a first time. The method additionally includes calculating probability determinations using the first set of telemetry measurements and a machine learning algorithm. The method also includes updating the machine learning algorithm using the first set of telemetry measurements. The method further includes sending the probability determinations to a control module. The method also includes generating control signals or alarm signals based on the probability determinations by the control module.

It is to be appreciated that embodiments of the present invention provide many advantages over conventional techniques. Among other things, diagnostic systems according to embodiments of the present invention can quickly determine and help fix link failures and other issues of a problems with minimal disruption and human intervention. By employing machine learning algorithms, the diagnostic system improves over time.

Embodiments of the present invention can be implemented with existing systems and processes. For example, a communication device with a diagnostic mechanism according to embodiments of the present invention can be made using existing manufacturing techniques and components. The diagnostic mechanism itself can be implemented to be compatible with existing communication systems and devices. For example, control signals and alarm signals generated by the diagnostic mechanisms of the present invention are compatible with existing formats and protocols, the improvement being the algorithms behind the decisions to sends these signals. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 5 is a simplified diagram illustrating a chart illustrating communication diagnostics according to embodiments of the present invention.

DETAILED DESCRIPTION OF THE INVENTION

Figure 1:
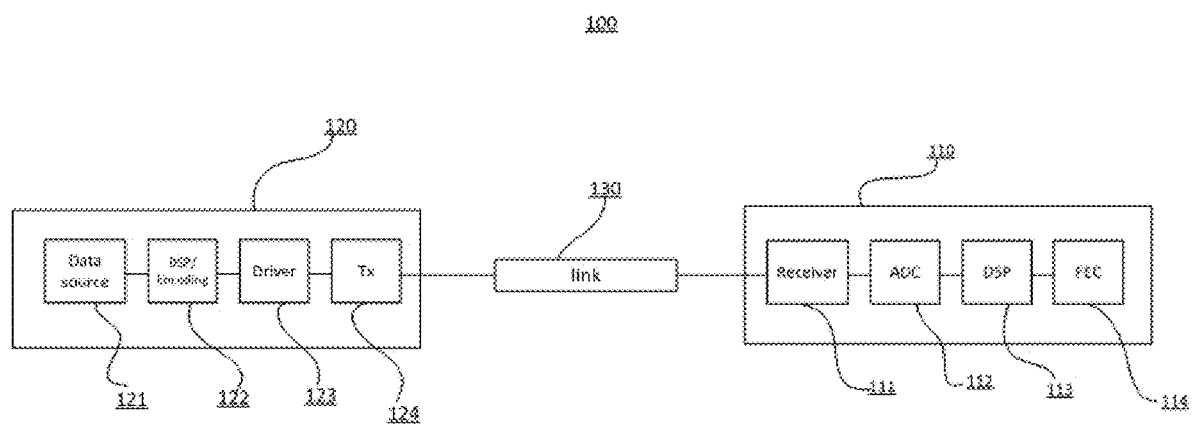
FIG. 1 is a simplified diagram illustrating a communication system according to an embodiment of the present invention.

The present invention is directed to communication systems. According to a specific embodiment, the present invention provides a network device that collects telemetry measurements related to the quality of data communication. A machine learning algorithm generates probability determinations using the telemetry measurements and an inference model. The probability determinations are used to generate alarms signals or activate repair algorithms. There are other embodiments as well.

As explained above, diagnosing problems within a communication network system is challenging. For example, a link failure can be caused by one of many components and entities along a communication path. There are various existing mechanisms to determine link failures, but they often involve human intervention and network shutdowns (to isolate the problem). It is to be appreciated that embodiments of the present invention provide machine learning algorithm that uses inference models to determine link failure probabilities and continuously improves the algorithm itself.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating a communication system according to an embodiment of the present invention. This diagram is merely an example, which should not unduly limit the scope of the claims. One of ordinary skill in the art would recognize many variations, alternatives, and modifications. A communication system 100 includes network entities 110 and 120 that communicate with each other via communication link 130. To use system 100 as an example, network entity 110 (shown with blocks for receiving data) receives data transmitted by network entity 120 (shown with block for transmitting data). But it is understood that both network entities are capable of transmitting and receiving data. The communication link 130 may be an optical communication link or an electrical communication link, and the network entities 110 and 120 would have optical or electrical communication interface accordingly. The data source 121 of network entity 120 provides data for transmission, and the data may be generated by network entity 120 and/or received from another entity. Block 122 processes and encodes the data from data source 121, and one or more processes performed by block 122 may reduce accuracy or speed of data transmission. In an example, block 122 performs FEC encoding. Block 123 generates a driving signal for transmission. Depending on the communication link 130 (e.g., optical or electrical) and communication protocol, block 123 may perform signal modulation or other processes that may introduce certain errors. Block 124 performs data transmission. When data pass through link 130, noise and interference may degrade the data and introduce errors. Network entity 110 receives data at block 111, converts received data to a digital form at block 112. For example, block 111 equalizes and amplifies the received signal, and improves signal-to-noise ratio for processing. Block 112 may generate a clock signal for the received data. One or more digital-signal-processing functions may be formed to improve data accuracy at block 113, and block 114 performs FEC decoding. Receiving and processing data by network entity 110 may introduce receiving errors.

The quality and reliability of data communication between network entities, as illustrates in FIG. 1, depend on many factors, such physical medium (e.g., link 130) and performance of various components of network entities. Network entities 110 and 120, for the purpose of illustration, are simplified examples and are shown with few components, while actual networks entities include many more components, each of which may cause system slow down or even link failure. It is challenging and expensive to determine which components caused link problem, as debugging a system often involves isolating and identifying problem components. It is to be appreciated that embodiments of the present invention provide an adaptive diagnostic system for repairing and optimizing communication systems through machine learning mechanisms. For example, network entity 110 as shown in FIG. 1 includes an inference module (not shown in FIG. 1) that makes probabilistic determinations of link quality and reliability. The probabilistic data from inference module can be used to adapt the receiver, thereby improving system performance.

Figure 2:
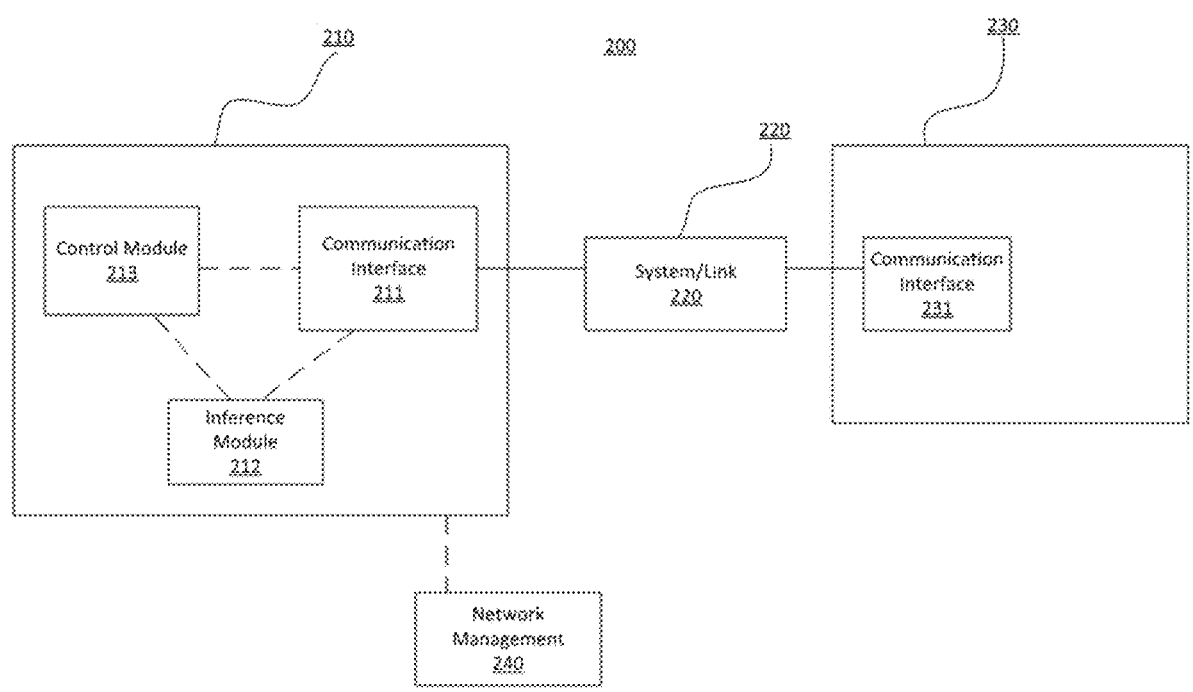
FIG. 2 is a simplified diagram illustrating an adaptive diagnostic system for communication networks according to embodiments of the present invention.

FIG. 2 is a simplified diagram illustrating an adaptive diagnostic system for communication networks according to embodiments of the present invention. This diagram is merely an example, which should not unduly limit the scope of the claims. One of ordinary skill in the art would recognize many variations, alternatives, and modifications. Communication system 200, as shown in FIG. 2, includes network entities 210 and 230 that communicate with each other via link 220. System 200 additionally includes a network management apparatus 240 connected to network entity 210. For example, network management apparatus uses network performance and operating parameters information—which may be in the form of alarm signals— generated by network entity 210 to monitor and improve performance of data communication. In various embodiments, network management apparatus 240 receives link failure and slowdown warnings and other information from multiple network entities and adaptively modifies operating parameters for these network entities accordingly. As an example, telemetry refers to measurements related to performance of data computation, and these measurements may include direct measurements (e.g., signal strength, amount of noise, etc.) and metrics calculated from direct measurements (e.g., jitter, FEC statistics, etc.).

For the purpose of illustration, network entity 210 collects telemetry measurements based on data transmitted by network entity 230 via link 220. For example, network entity 230 includes a communication interface 231 for data transmission; the communication interface 231 may include a digital signal processing (DSP) module for processing received signal and an Application-specific integrated circuit (ASIC) chip for data transmission. As explained above, network entity 230 may include components that can affect communication link quality not shown here in FIG. 2. For example, network entity 230 may introduce coding errors and transmission errors, and one or more components of network entity 230 may simply breakdown or otherwise malfunction (e.g., overheating, humidity, silicon failure, etc.). Network entity 210 includes communication interface 211 for data communication with network entity 230 over link 220. For example, communication interface 211 may include a DSP module for processing received signal and an ASIC chip for data transmission. Communication interface 211 collects telemetry related to communication link quality. For example, telemetry for received data includes SNR, SNR variation over time, PAM4 histogram (if PAM4 protocol is used), FEC statistics, jitter statistics, equalization taps, and others. In various embodiments, the communication interface 211 sends the collected telemetry measurements in the form a vector storing telemetry values to inference module 212. For example, inference module 212 generates failure event probability determinations by using machine learning techniques (described below) using the telemetry collected by and received from communication interface 211. For example, probability determinations include likelihood of various link failure mechanisms, degradation or failure of certain components, etc. In addition to making probability determinations, inference module 212 may additionally use the received telemetry values, combined with additional data from other sources such as network management system on the link failure mechanism (which can be organized and stored to form training data), to update its machine learning algorithm. For example, specific processes may be performed to generate training data from telemetry values (e.g., only certain types of telemetry values are useful for machine learning, such as failure events, boundary conditions, etc.). Based on the probability determinations received from inference module 212, control module 213 generates send control signals to improve the quality of communication link. Control module 213 is connected to communication interface 211 and/or other components of network entity 210. The control signals generated by control module 213 are used to adjust one or more operating parameters of these components. The control signals may also include alarm indications of link failures. For example, control module 213 is connected to network management module 240, and control module 213 is configured to send both alarm indications and control signals to network management module 240. Network management module 240, being connected to multiple network entities and devices, can then use the information received from control module 213 to modify behaviors of these network entities and their components. For example, network management module 240 may generate its own set of control signals based on the determinations made by inference module 212 and/or control module 213. For example, the control signals from network manage module 240 can be used to adjust operating parameters of link 220 or network entity 230. In various embodiments, the processes of collecting telemetry, making probability determinations, and generating control signals are performed periodically at predetermined intervals.

In certain situations, link failures or quality issues can be traced to a single factor, and repair or adjustment is performed for that single factor. In a communication system, there are many network entities and communication links. More often, degradation and failures of communication links are caused by multiple of factors. For example, two entities may each be functioning correctly, but their behaviors relative to each other cause link failure or slowdown (e.g., two network entity jamming a shared communication link). Additionally, it is often impractical to isolate the cause of link failures and degradation—many factors may be interrelated—when the communication system is in operation. Embodiments of the present invention involve inference models and machine learning that processes a vector of telemetry values (based on collected telemetry measurements), which include multiple (e.g., over 10) metrics associated with the quality and reliability of data communication. It is to be appreciated that machine learning algorithms according to embodiments of the present invention can generate "self-healing" mechanisms to improve link quality. For example, the control signals generated by control module 213 can be used to adjust multiple operating parameters used by multiple components of different network entities. For example, network entity 210 may directly use control signals generated by control module 213, as control module 213 is a component of network entity 210, and controls signals may be used to adjust equalization, timing recovery, and decoding parameters for processing received signals. The network management module 240 can use the control signals to adjust performance characteristics of multiple entities and components.

Depending on the implementation, both inference module 212 and control module 213 can be configured as a part of a feedback loop: i.e., based on the change of telemetry in response to control signals generated by control module, inference module 212 can determine the likelihood of one or more factors that cause link failure or quality issues, and control module 213 generates modified control signals accordingly. The inference module 212 may use the telemetry received from the feedback loop to update training data (e.g., including information such as failure category), which can be used by the machine learning algorithm to improve its own accuracy and performance. In various embodiments, inference module 212 is implemented with a machine learning classification model. For example, machine learning classification model may be implemented with Softmax, decision tree, neural network, and others. The machine learning module may combine unsupervised with supervised algorithms in a pipeline; for example, a principal component analysis (PCA) followed by a classification algorithm, such as Softmax regression, operating on certain principal components selected by PCA.

In various scenarios, while the machine learning mechanisms described above can effectively diagnose network issues, fixing these issues is beyond the "self-healing" process. For example, if a physical link (e.g., link 220) is physically damaged somewhere, the machine learning mechanism implemented at network entity 210 can infer that it is likely there is physical damages at certain location of the physical link, and network management module 240 may even generate control signals to route data through a different physical link, but the physical damage of the physical link needs to be repair by an engineer or through some automated mechanism by the network management system. Even in such scenario, the machine learning mechanism is incredibly useful, as it reduces the amount of time the engineer needs to identify and locate the problem—many hours of network trouble shooting are reduced to a quick fix of broken communication link.

The machine learning mechanisms, as implemented according to embodiments of the present invention, use many telemetry values and need thousands of data sets (e.g., each data set being associated with a data link) to train. But it is also to be noted that machine learning algorithms according to the present invention are different from deep learning algorithms that are trained with much larger data sets (usually orders of magnitude larger). A network system (e.g., as implemented in a data center) can only provide so many data sets that can be used for training machine learning algorithms. To use the relatively limited (e.g., thousands, not millions) data sets to train the diagnostic and management algorithm requires selection of highly relevant network metrics as input. In various embodiments, specialized inference models (e.g., such as Softmax and decision tree-based methods) are used to determine link quality based on a large number of inputs (i.e., telemetry measurements). FIG. 2 shows that entity 210 is coupled to entity 230 via link 220. Some of the telemetry data are related to link 220 and how data are transmitted from one network entity to another via link 220. In such instances, diagnostic mechanisms according to the present invention may involve transmitting test data between the two entities over link 220 to identify the problem source. In certain situations, the entity having communication related problem may have already been identified, and the diagnostic process is restricted to this particular entity. For example, this entity may operate in a debugging mode, in which test pattern is fed to the entity (without involving the communication and other network entities) and related telemetry data are collected and processed. Depending on the situation, the debugging mode may be online or offline. In a specific embodiment, the debugging mode is remotely executed.

Figure 3:
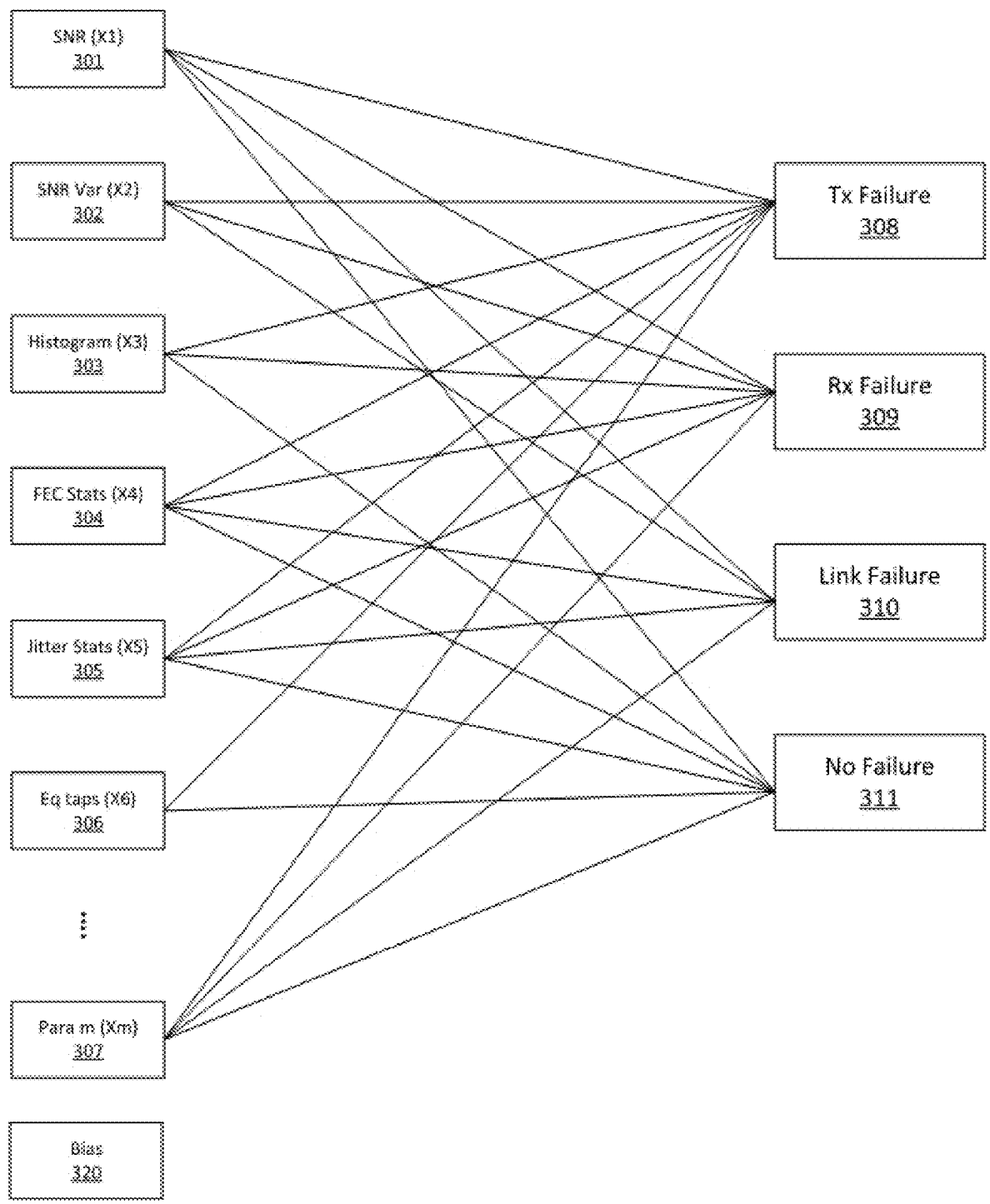
FIG. 3 is a simplified diagram illustrating an exemplary machine learning mechanism for communication diagnostics according to embodiments of the present invention.

FIG. 3 is a simplified diagram illustrating an exemplary machine learning mechanism for communication diagnostics according to embodiments of the present invention. This diagram is merely an example, which should not unduly limit the scope of the claims. One of ordinary skill in the art would recognize many variations, alternatives, and modifications. On the left side, a number of telemetry measurements are used as input for a machine-learning inference engine that is used to predict probabilities of failure events. As shown, telemetry measurements include SNR ($x_1$) 301, SNR variation over time ($x_2$) 302, histogram (PAM4) and statistical parameters ($x_3$) 303, FEC statistics ($x_4$) 304, jitters statistics ($x_5$) 305, equalizer taps ($x_6$) 306, etc., with a total m number of parameters—the last parameter being parameter m ($x_m$) 307 as shown. Probabilistic determinations are shown on the right, which include transmission failure 308, receiving failure 309, link failure 310, and no failure 311. For each of the probabilistic determinations, the calculation depends on each of the telemetry measurements on the left (their connections are shown in FIG. 3) and bias 320. Each of the telemetry measurements on the left side is assigned a weight for each of the probabilistic determinations on the right. For example, initial weights assigned to the telemetry measurements and bias 320 are based on a predetermined preset. For example, the predetermined preset may be based on empirical data collected for the communication system or reference values. During the machine learning and training process, the weight assigned to these telemetry values are updated, and so is the calculus used for making the probabilistic determinations. For example, in Softmax regression, the probabilistic determinations are calculated using Equation 1 below:

$$P(y = j \mid x) = \frac{e^{x^T w_j}}{\sum_{k=1}^{K} e^{x^T w_k}} \quad \text{Equation 1}$$

In Equation 1, the probability P for $j^{th}$ sample vector x is determined based on the value of sample vector x (i.e., m telemetry measurement as shown in FIG. 3) and weighting vector w (weights assigned to the m telemetry measurements), and depending on the implementation, bias 320 may be added to the calculation. For example, another form of Softmax function is described in Equation 2 below:

$$\text{softmax}(Ln) = \frac{e^{Ln}}{|e^L|} \quad \text{Equation 2}$$

In Equation 2, the output of Softmax function softmax ($L_n$) is calculated from term which is the sum of all telemetry measurements (plus bias 320), provided that telemetry measurements had been converted to standardize telemetry values. As an example, the output of Softmax function is used by the control module and/or the network management module in FIG. 2 to generate control signals or link failure notifications. Additionally, the output of the Softmax function can also be used to provide meaningful information on performance and reliability of components of the communication, allowing network support personnel to perform diagnostics and optimization processes.

Figure 4:
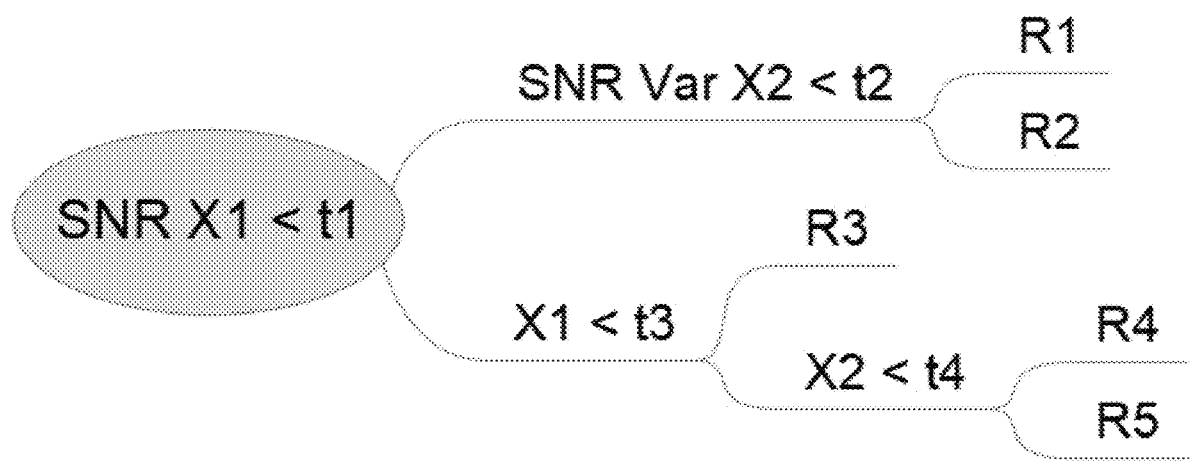
FIG. 4 is a simplified diagram illustrating an inference mechanism for communication diagnostics according to embodiments of the present invention.

FIG. 4 is a simplified diagram illustrating an inference mechanism for communication diagnostics according to embodiments of the present invention. This diagram is merely an example, which should not unduly limit the scope of the claims. One of ordinary skill in the art would recognize many variations, alternatives, and modifications. For the purpose of illustration, the decision tree in FIG. 4 is simplified and showing only two variables SNR ($X_1$) and SNR variability ($X_2$). The probability determinations (i.e., $R_1$ to $R_5$ in FIG. 4) as shown are generated by comparing variable $X_1$ and $X_2$ against threshold values (i.e., $t_1$ to $t_4$ as shown). For a network system, m number of telemetry values ($X_1$ to $X_m$) maybe used to generate n number of probabilistic determinations $R_1$ to $R_n$. For example, initial threshold values are based on a predetermined preset, which can be determined using empirical data collected for the communication system or reference values. During the machine learning and training process, these threshold values may be adjusted accordingly. The probabilistic determinations $R_1$ to $R_m$ can be used in various ways, as described above. For example, the control module or the network management module in FIG. 2 use values $R_1$ to $R_m$ to modify behavior of various network entities or components. And values $R_1$ to $R_m$ can also be used to generate report on network performance and reliability. In various embodiments, the simple decision tree model in FIG. 4 can be generalized to include Random Forrest and Gradient Boosted Tree models.

FIG. 5 is a simplified diagram illustrating a chart illustrating communication diagnostics according to embodiments of the present invention. This diagram is merely an example, which should not unduly limit the scope of the claims. One of ordinary skill in the art would recognize many variations, alternatives, and modifications. For each link (link 1 to link n), the chart in FIG. 5 stores values ($X_1$ to $X_m$) corresponding to telemetry measurements, and the failure category for that link is stored with variable Y. For example, telemetry measurements are converted to values using a predetermined algorithm. The chart in FIG. 5 becomes useful for training the machine learning algorithm when n is sufficiently large (e.g., typically n should be at least 10 times the number of features or size of X).

Figure 6:
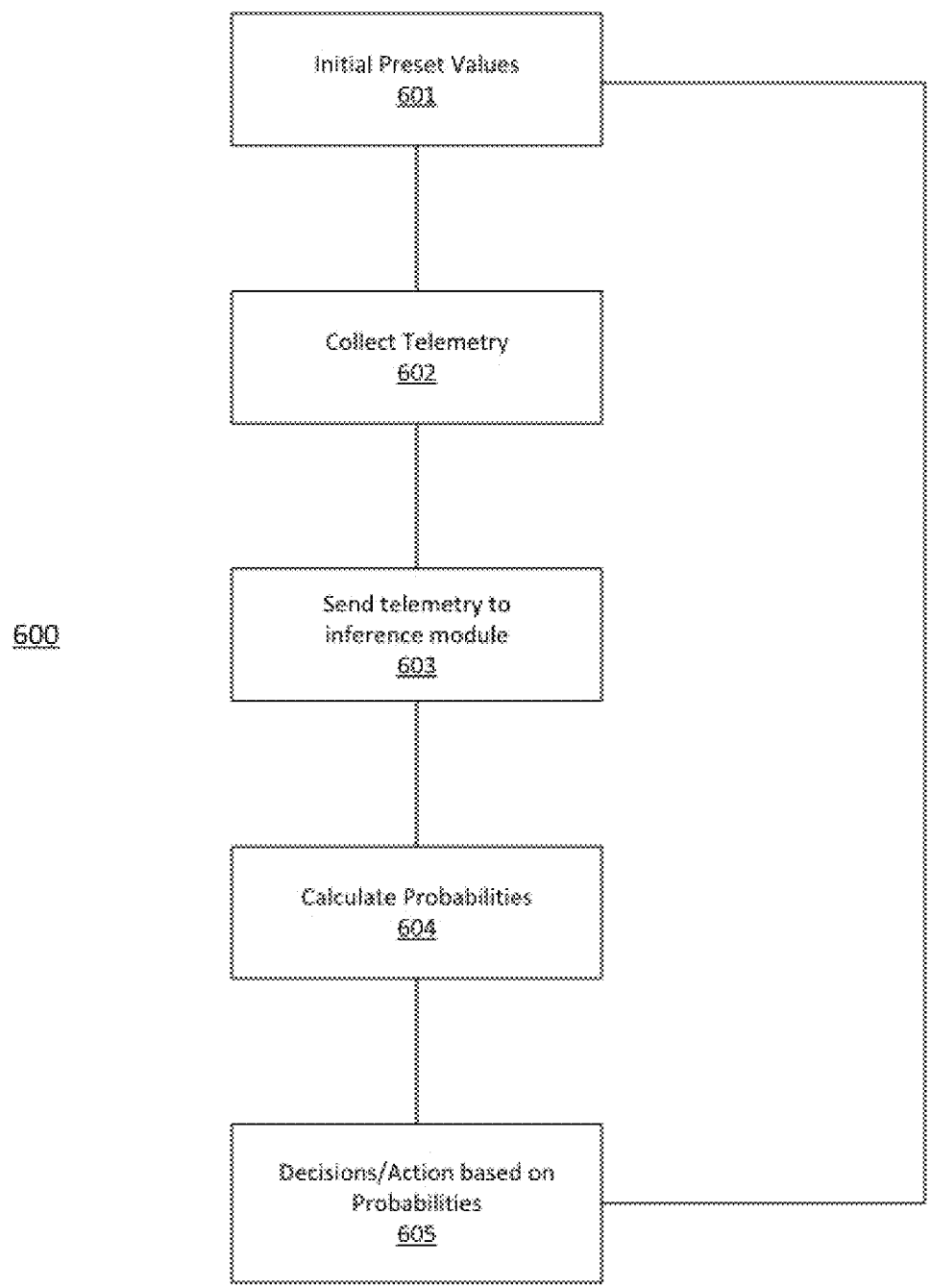
FIG. 6 is a simplified flow diagram illustrating a process for diagnostics and optimization of a communication system according to embodiments of the present invention.

FIG. 6 is a simplified flow diagram illustrating a process for diagnostics and optimization of a communication system according to embodiments of the present invention. This diagram is merely an example, which should not unduly limit the scope of the claims. One of ordinary skill in the art would recognize many variations, alternatives, and modifications. For example, one or more steps illustrated in FIG. 6 may be added, removed, repeated, rearranged, modified, and/or overlapped, and they should not limit the scope of claims. For example, process 600 illustrated in FIG. 6 may be implemented with system 200 illustrated in FIG. 2.

At block 601, various values are initialized. For example, in a system implemented with a softmax function, initialization involves assigning initial weights to telemetry values and the bias value, and the initial weights may be previously stored in a lookup table (e.g., stored in non-volatile memory). As another example, where a decision tree is used for inference modeling, threshold values and how these threshold values are used are set during the initialization process, and the threshold values may be determined empirically or obtained from a manufacturer preset. For example, the manufacturer preset may be used as a part of an initiation algorithm for network system deployment. In addition to initializing various values, algorithm for computation may be selected and configured as well. For example, optical links and electrical links depend on different telemetry measurements, and the appropriate algorithm and settings thereof are selected accordingly. It is to be appreciated that the inference model deployed for a communication system is specifically tailored to that specific system (e.g., different inference models may be appropriate for fiber optic versus copper links).

At block 602, telemetry is collected by a receiving entity. As explained above, telemetry includes many measurements, such as SNR, FEC statistics, etc. Using FIG. 2 as an example, communication interface 211 is configured to collect telemetry measurements. Telemetry collection can be in various forms. For example, analog SNR may be measured at the communication interface, and coding related metrics may be calculated by the receiver. As an example, FEC error statistics are calculated (e.g., using a DSP module) after converting received analog signal to digital signal and the digital signal is decoded. Depending on the communication system, the types of telemetry measurements are selected accordingly. For example, PAM4 histogram information is collected and determined for PAM4 optical communication protocol.

At block 603, telemetry is sent to an inference module, which is configured to use machine learning algorithms to make probability determinations. In various embodiment, telemetry measurements are converted to a data structure comprises a vector of telemetry values corresponding to measurements (and calculations) related to quality of data communication. For example, FIG. 2 shows communication interface 211 is connected to inference module 212, and the communication interface 211 sends telemetry to inference module 212. Depending on the implementation, telemetry may be sent by other components to the machine learning module. Before telemetry data are sent to the machine learning module, they may be formatted or cleaned. For example, telemetry data are sent to the machine learning process as a vector of telemetry values.

At block 604, probability of link error is calculated. Again using FIG. 2 as an example, inference module 212 determines probabilities of each link failure category, using the received telemetry and the previously trained machine learning model, and the probability determinations are sent to control module 213. As a part of the training process, the machine learning model can be updated using the received telemetry when the link failure category is known from other means. For example, Softmax or decision tree-based models, or a combination of different models, may be used for probability determinations for link failure categories. Telemetry data may be cleaned or otherwise processed before used for probability determination.

At block 605, probability determinations are used to generate decisions and/or actions. The diagnostic process 600 returns to block 601 for continuous monitoring. For example, control module 213 in FIG. 2 may, based on the received probability determinations, generate and send an alert signal to the network management system; control module 213 may also be capable of address link perform issues in light of the received probability determinations. For example, the probability determination may identify problems associated with a physical data link and send an alarm to the network management system. The control module may take actions (e.g., activating an algorithm) to fix the problem if there is a high probability of receiving error due to a known issue.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A network device comprising:
a communication interface comprising a digital signal processor for transmitting data and an application specific integrated circuit for receiving data, the communication interface configured to receive a signal via a communication link and measure a plurality of parameters related to transmission of the signal to provide a plurality of vectors indicative of the plurality of parameters;
an inference module configured to
weight each of the plurality of vectors for a plurality of possible failures such that ones of the plurality of possible failures are each allocated a respective set of weighted vectors, and
generate each of a plurality of probability values based on a machine learning classification model of a network system and a respective one of the sets of weighted vectors, the network system comprising the network device, each of the plurality of probability values indicating a probability that a respective one of the plurality of possible failures has occurred at a respective location among a plurality of locations in the network system, and each of the plurality of possible failures corresponds to a different one of the plurality of locations; and
a control module configured, based on the plurality of probability values, to perform a countermeasure to at least one of improve transmission performance associated with the communication link or correct a failure associated with transmission of the signal via the communication link.

2. The network device of claim 1, wherein:
the communication link comprises an optical communication link; and
the inference module is configured to generate one of the plurality of parameters based on a 4-level pulse amplitude modulation (PAM4) histogram.

3. The network device of claim 1, wherein:
the inference module is configured to generate the plurality of probability values based on a softmax regression model; and
the machine learning classification model comprises the softmax regression model.

4. The network device of claim 1, wherein:
the inference module is configured to generate the plurality of probability values based on a decision tree model; and
the machine learning classification model comprises the decision tree model.

5. The network device of claim 1, wherein:
the network device is in communication with another network device via the communication link; and
the control module is configured to:
in response to the plurality of probability values, determine that the failure associated with transmission of the signal exists at the another network device, wherein the failure associated with the transmission of the signal refers to the another network device exhibiting at least one of a coding error, a transmission error, an error associated with overheating, an error associated with humidity, or an error associated with silicon failure, and
generate an algorithm to repair the another network device.

6. The network device of claim 1, wherein:
the inference module is configured to generate the plurality of probability values based on a neural network, and
the machine learning classification model comprises the neural network.

7. The network device of claim 1, wherein:
the network device is in communication with another network device via the communication link; and
the control module is configured to
in response to the plurality of probability values, determine that a failure exists at the another network device, and
initiate execution of an algorithm to repair the another network device.

8. The network device of claim 1, wherein the inference module is configured to update the machine learning classification model based on the plurality of parameters.

9. The network device of claim 1, wherein:
the inference module is configured to, based on the plurality of probability values, determine a receiving failure exists at the network device; and
the control module is configured to generate an algorithm to repair the receiving failure.

10. The network device of claim 1, wherein:
the inference module is configured to, based on the plurality of probability values, determine that a failure exists at a particular device, the particular device being (i) the network device, (ii) a link between the network device and another network device, or (iii) the another network device; and
the control module is configured to operate in a debugging mode to debug the failure at the particular device and generate a test pattern for diagnosing the failure.

11. The network device of claim 1, wherein the control module is configured to perform the countermeasure including generating an alarm signal indicating the plurality of probability values, and transmit the alarm signal to a network management system separate from the network device.

12. The network device of claim 1, wherein the inference module is configured to select:
the plurality of vectors include a first plurality of vectors or a second plurality of vectors;
a first plurality of parameters to measure and provide the first plurality of vectors when the communication link is an optical communication link; and
a second plurality of parameters to measure and provide the second plurality of vectors when the communication link is an electrical communication link.

13. The network device of claim 1, wherein the inference module is configured to:
weight each of the plurality of vectors to generate another set of weighted vectors; and
generate another probability value based on the machine learning classification model and the another set of weighted vectors, the another probability value indicative of whether no failure has occurred in the network system.

14. The network device of claim 1, wherein the inference module is configured to generate the plurality of probability values for the plurality of locations, and the plurality of locations refer to (i) the network device, (ii) a link between the network device and another network device, and (iii) the another network device.

15. The network device of claim 1, wherein the inference module is configured to:
   iteratively measure the plurality of parameters; and
   for each iteration,
      update the machine learning classification model based on a latest measured set of the plurality of parameters, and
      update the plurality of probability values based on the updated machine learning classification model.

16. The network device of claim 1, wherein the inference module is configured to:
   iteratively measure the plurality of parameters; and
   for each iteration,
      update weights of the sets of weighted vectors based on a latest measured set of the plurality of parameters, and
      update the plurality of probability values based on the updated weights of the sets of weighted vectors.

17. A diagnostic method comprising:
   receiving at a network device a signal via a communication link;
   measuring a plurality of parameters related to transmission of the signal to provide a plurality of vectors indicative of the plurality of parameters;
   weighting each of the plurality of vectors for a plurality of possible failures such that each of the plurality of possible failures is allocated a respective set of weighted vectors;
   generating each of a plurality of probability values based on a machine learning classification model of a network system and a respective one of the sets of weighted vectors, the network system comprising the network device, each of the plurality of probability values indicating a probability that a respective one of the plurality of possible failures has occurred at a respective one of a plurality of locations in the network system, and each of the plurality of possible failures corresponding to a different one of the plurality of locations; and
   based on the plurality of probability values, performing a countermeasure to at least one of improve transmission performance associated with the communication link or correct a failure associated with transmission of the signal via the communication link.

18. The method of claim 17, further comprising:
   measuring again the plurality of parameters to provide an updated plurality of vectors;
   weighting each of the updated plurality of vectors for the plurality of possible failures such that each of the plurality of possible failures is allocated a respective updated set of weighted vectors; and
   generating each of a plurality of updated probability values based on the machine learning classification model and a respective one of the updated sets of weighted vectors.

19. The method of claim 17, further comprising:
   iteratively performing a machine learning algorithm to update the machine learning classification model;
   during a first iteration of the machine learning algorithm, weighting the plurality of vectors with preset initial weight values; and
   during subsequent iterations of the machine learning algorithm, weighting a plurality of updated vectors based on an updated set of weight values for that iteration.

20. The method of claim 17, further comprising:
   determining a receiver failure of the network device based on the plurality of probability values; and
   executing a repairing algorithm to correct the receiver failure.

* * * * *